United States Patent
Rahimi et al.

(10) Patent No.: US 12,448,599 B2
(45) Date of Patent: Oct. 21, 2025

(54) SYSTEM FOR ASSESSING A MICROBIAL CHARACTERISTIC WITHIN A GROWING MEDIUM AND ASSOCIATED METHODS

(71) Applicant: Purdue Research Foundation, West Lafayette, IN (US)

(72) Inventors: Rahim Rahimi, West Lafayette, IN (US); Jose Waimin, Gilbert, AZ (US)

(73) Assignee: Purdue Research Foundation, West Lafayette, IN (US)

( * ) Notice: Subject to any disclaimer, the term of this patent is extended or adjusted under 35 U.S.C. 154(b) by 655 days.

(21) Appl. No.: 17/858,302

(22) Filed: Jul. 6, 2022

(65) Prior Publication Data

US 2023/0011317 A1    Jan. 12, 2023

Related U.S. Application Data

(60) Provisional application No. 63/218,777, filed on Jul. 6, 2021.

(51) Int. Cl.
| | |
|---|---|
| C12M 1/34 | (2006.01) |
| G01N 27/02 | (2006.01) |
| G01N 33/00 | (2006.01) |
| G01N 33/487 | (2006.01) |

(52) U.S. Cl.
CPC ............ C12M 41/36 (2013.01); C12M 41/46 (2013.01); G01N 27/02 (2013.01); G01N 33/0031 (2013.01); G01N 33/48735 (2013.01); C12M 41/32 (2013.01)

(58) Field of Classification Search
CPC ...... C12M 41/36; C12M 41/46; C12M 41/32; G01N 27/02; G01N 33/0031; G01N 33/48735; G01N 27/026
USPC ....................................................... 324/692
See application file for complete search history.

(56) References Cited

U.S. PATENT DOCUMENTS

| | | | | |
|---|---|---|---|---|
| 2004/0009572 | A1* | 1/2004 | Felice | C12M 41/48 435/243 |
| 2009/0317859 | A1* | 12/2009 | Daniels | C12Q 1/04 702/19 |
| 2010/0305867 | A1* | 12/2010 | Rising | C12Q 1/04 702/19 |
| 2017/0191110 | A1* | 7/2017 | Li | C12Q 1/04 |
| 2021/0382026 | A1* | 12/2021 | Narula | G01N 21/01 |

OTHER PUBLICATIONS

Gu, Ji-Dong, et al., "Microbial Degradation of Polymeric Coatings Measured by Electrochemical Impedance Spectroscopy", Biodegradation 9: pp. 39-45, (1998).

(Continued)

*Primary Examiner* — Raul J Rios Russo
(74) *Attorney, Agent, or Firm* — Hartman Global IP Law; Gary M. Hartman; Domenica N. S. Hartman

(57) ABSTRACT

Systems and methods for assessing a microbial characteristic within a growing medium. Such a system assesses one or more microbial characteristics, such as biomass and/or microbial activity, within a growing medium, such as soil. Electrical properties of a microbially degradable material in contact with the growing medium are measured. The measurements are used to determine the microbial characteristic(s) based at least partly on degradation of the microbially degradable material.

19 Claims, 14 Drawing Sheets

(56) References Cited

OTHER PUBLICATIONS

Sabot, A. et al., "Simultaneous Quartz Crystal Microbalance Impedance and Electrochemical Impedance Measurements. Investigation into the Degradation of Thin Polymer Films", Anal. Chem. 74, pp. 3004-3311, (2002).
Sanchez, et al., "Electrochemical Impedance Spectroscopy Studies of Polymer Dewgradation: Application to Biosensor Development", Anal. Chem., vol. 24, No. 1, pp. 37-48, (2005).
Schusser, S. et al., "Impedance Spectroscopy: A Tool for Real-Time in situ Monitoring of the Degradation of Biopolymers", Phus. Status Solidi A 210, No. 5, pp. 905-910, (2013).
Schusser, S. et al., "Characterization of Biodegradable Polymers with Capacitive Field-Effect Sensors", Sensors and Actuators B 187 pp. 2-7 (2013).

\* cited by examiner

| | $Z_{max}(\Omega)$ | $Z_{min}(\Omega)$ | $Z_d(\Omega)$ | $Z_{avg}(\Omega)$ | $Z_{net}(\Omega)$ | $\Delta Z_{net}(\Omega)$ |
|---|---|---|---|---|---|---|
| Sense (t=0) | 561.76 | -33.34 | 469.30 | -308.75 | | |
| Control (t=0) | 18.55 | -53.31 | 11.09 | -14.88 | | |
| t = 0 | | | | | 544.35 | 0 |
| Sense (t=48) | 380.48 | -30.46 | 327.96 | -192.89 | | |
| Control (t=48) | 18.83 | -50.01 | 12.10 | -14.43 | | |
| t = 48 | | | | | 362.79 | -181.6 |

Table S1

FIG. 22

SYSTEM FOR ASSESSING A MICROBIAL CHARACTERISTIC WITHIN A GROWING MEDIUM AND ASSOCIATED METHODS

CROSS REFERENCE TO RELATED APPLICATIONS

The present application claims the benefit of provisional U.S. Patent Application No. 63/218,777, filed Jul. 6, 2021, the contents of which are incorporated by reference in their entirety herein.

BACKGROUND OF THE INVENTION

The present invention generally relates to microbial biomass and activity in agricultural ecosystems. The invention particularly relates to systems and methods capable of assessing one or more microbial characteristics, such as biomass and/or microbial activity, within a growing medium (as a nonlimiting example, soil) by measuring electrical properties of a microbially degradable material in contact with the growing medium to determine the degradation thereof.

Microorganisms are essential in the biological and chemical processes which directly affect agricultural yields in soils and other growing media. Microbial activity has been widely used as a marker of soil health as it affects the soil's ability to retain fertilizers and impacts micronutrient availability. Microbial activity has been strongly correlated to high yields in the production of soybean, sorghum, rye, and corn. Microorganisms also have the potential to decrease the excessive use of synthetic fertilizers, which present health and environmental concerns. For example, nitrogen fixing bacteria are a group of microorganisms responsible for fixing nitrogen in the soil and converting it into nitrate, which can be more readily processed by plants. As high as 80% of the biologically fixed $N_2$ comes from symbioses involving leguminous plants and several species of nitrogen fixing bacteria. Having the ability to assess and monitor the activity of such organisms could pave the way towards more sustainable agricultural practices.

One of the main issues with using microbial activity as a marker of soil health is the difficulty in quantifying activity in the field. Current in-lab methods of detection often require sampling of soils and long-term incubation periods in a laboratory setting. Among the methods for biomass and activity level quantification; direct microscopy, DNA/RNA sequencing, Phospholipid Fatty Acid Analysis (PLFA), and Chloroform Fumigation Extraction (CFE) are the most commonly used. Direct microscopy methods are effective in determining size and shape as well as complex properties such as presence of a peptidoglycan layer. Through DNA and RNA sequencing it is possible to identify specific genes within sampled groups. Despite these functions, no assessment of bacteria viability or microbial activity can be achieved using these techniques alone. Other methods, like PLFA and CFE can provide information on bacterial viability and specific functions, but are limited in the need of large sampling and use of toxic agents.

Although traditional in-lab techniques are successful, it has been estimated that less than 1% of bacteria and 17% of fungi are culturable under the most ideal laboratory conditions. Most microorganisms, specifically bacteria, will either die or remain dormant once they are removed from their natural habitat. Due to this limitation, other techniques have been developed with the aim of studying microbial activity and biomass directly in the soil. Two of the most common techniques for in-situ studies include Substrate-induced Respirometry (SIR) and physical methods such as the Cotton Strip Assay (CSA).

Using the SIR technique, a substrate (typically glucose) is added to the soil at a saturating concentration. Bacteria utilize glucose as a source of energy in aerobic respiration, the product being $CO_2$ gas. By measuring the $CO_2$ output of substrate-induced soils compared to non-treated soils, it is possible to determine both the number of viable microbes in the soil as well as their level of activity. The complexity of the setup and delicacy of collected samples makes this method difficult to implement on a large scale. Alternatively, the CSA technique is based on measuring the loss in tensile strength of textile fabrics buried in the soil to quantify microbial activity. The current practice uses cotton as the standard fabric due to its high cellulose content (90%). Bacteria in the soil tend to breakdown cellulose in the cotton, thereby decreasing the tensile strength of the fabric and providing a direct signal of activity. The extent of this technique's ability to detect microbial activity has been proven in several experiments for various ecological environments. This has been compared to other standard methods and shown to be a simpler technique with a comparable degree of accuracy. Despite the simplicity of the CSA method, it has some limitations. Cotton strips must be buried in the fields for long periods of time and real time assessment of degradation is non-trivial.

In view of the above, it can be appreciated that there are certain problems, shortcomings or disadvantages associated with the prior art, and that it would be desirable if systems and methods were available for assessing microbial biomass or microbial activity directly in a growing medium, such as soil in-situ and/or in a lab, that were capable of at least partly overcoming or avoiding the problems, shortcomings or disadvantages noted above.

BRIEF DESCRIPTION OF THE INVENTION

The present invention provides systems and methods suitable for assessing microbial biomass or microbial activity directly in a growing medium, such as soil.

According to one nonlimiting aspect of the invention, a system for assessing a microbial characteristic within a growing medium is provided. The system includes a control sensor configured to be located in a growing medium and to measure electrical resistance of the growing medium while therein. A sensing sensor is configured to be located in the growing medium and to measure electrical impedance of a sensing element thereof while in the growing medium. The sensing element includes a microbially degradable material on a surface of the sensing element. Contact of the sensing element with bacteria in the growing medium causes physical degradation of the microbially degradable material, and degradation of the microbially degradable material changes the impedance of the sensing element. A computer system is configured to determine a characteristic of the bacteria in the growing medium based on a resistance of the growing medium and an impedance of the sensing element as measured by the control sensor and the sensing sensor.

According to another nonlimiting aspect of the invention, a method of fabricating a sensing sensor for assessing a microbial characteristic in a growing medium is provided. The sensing sensor is configured to be located in the growing medium and to measure electrical impedance of a sensing element thereof while in the growing medium. The method includes forming a sensor electrode comprising an array of exposed, interdigitated electrodes on a substrate, coating the array on the substrate with a solution, and curing the solution to form a microbially degradable film on the array. In some arrangements, a pretreatment process may be performed on the array prior to coating the array with the solution.

According to yet another nonlimiting aspect of the invention, a method of assessing a microbial characteristic in a growing medium is provided. The method includes locating a control sensor in the growing medium, wherein the control sensor is configured to generate measurements of electrical resistance of the growing medium, and locating a sensing sensor in the growing medium. The sensing sensor comprises a sensing element configured generate measurements of electrical impedance and a film of microbially degradable material on the surface of the sensing element. Degradation of the film changes impedance of the sensing element, and contact of the sensing element with bacteria in the growing medium causes physical degradation of the microbially degradable material. Measurements obtained by the control sensor and the sensing sensor are received simultaneously. The measurements are analyzed to determine the resistance of the growing medium and the impedance of the sensing element. A characteristic of bacteria in the growing medium is determined based on the resistance of the growing medium and the impedance of the sensing element.

Other aspects of the invention include methods of fabricating the control and sensing sensors described above, and methods of assessing and/or monitoring microbial activity in a growing medium with a system of the type described above.

Technical effects of the system and methods described above preferably include the ability to measuring microbial biomass or microbial activity directly in a growing medium, such as soil.

Other aspects and advantages of this invention will be appreciated from the following detailed description.

BRIEF DESCRIPTION OF THE DRAWINGS

FIG. 1A shows inoculation of the solution with bacteria. FIG. 1B shows the bacteria proliferating in the solution over time, which accelerates degradation of the CA film. FIGS. 1C and 1D show cross-sectional views of the sensing IDE of FIGS. 1A and 1B, respectively, and its equivalent circuit model before biodegradation of the CA film. $Z_{int}$ (FIG. 1C) and after biodegradation of the CA film. $Z_{int}$ (FIG. 1D: interfacial impedance, $Z_{film}$: impedance of CA film, and $R_{soi}$: culture medium resistance, $Z_{film}$ decreases as the bacteria metabolize the CA coating.)

FIG. 22 is a table (Table 51) displaying data including magnitude ($Z_{mag}$), phase ($Z_{phase}$), real ($Z_{real}$), and imaginary ($Z_{imag}$) values for sensing and control IDEs at 10 kHz in 20% LB/25° C. at t=0 and t=48 after inoculation. Results for differential impedance ($Z|_{diff}$) and relative changes in differential impedance ($\Delta|Z_{diff}|$).

DETAILED DESCRIPTION OF THE INVENTION

Figures 1A, 1B, 1C, 1D:
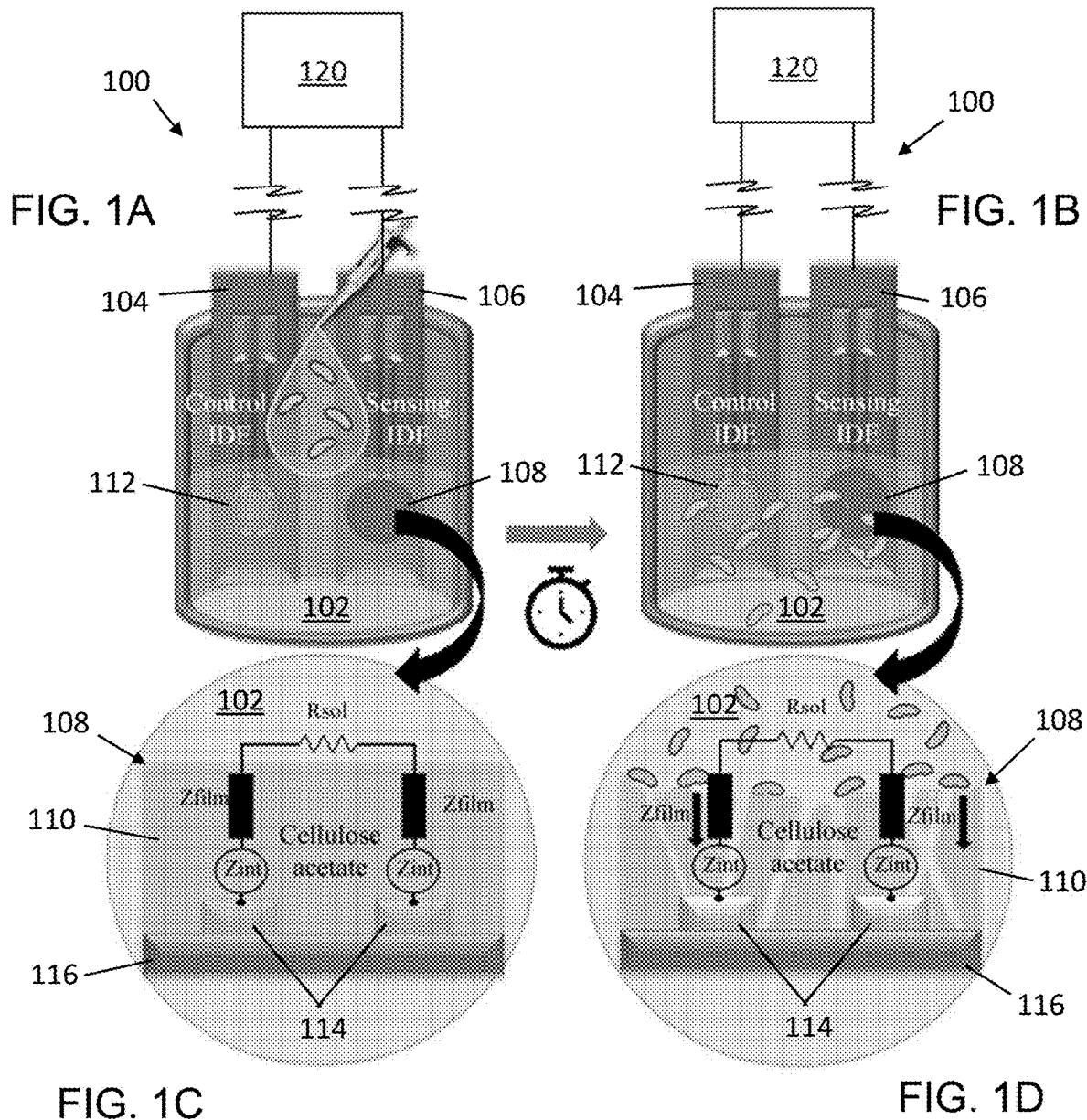
FIGS. 1A through 1D are schematic representations of a system having a pair of sensors (sensing interdigitated electrode (IDE; CA film coating) and control IDE (non-coated)) for microbial activity detection in an aqueous solution (LB/PBS media) in accordance with certain nonlimiting aspects of the invention.

The intended purpose of the following detailed description of the invention and the phraseology and terminology employed therein is to describe what is shown in the drawings, which include the depiction of one or more nonlimiting embodiments of the invention, and to describe certain but not all aspects of what is depicted in the drawings, including the embodiment(s) depicted in the drawings. The following detailed description also describes certain investigations relating to the embodiments depicted in the drawings, and identifies certain but not all alternatives of the embodiment(s) depicted in the drawings. Therefore, the appended claims, and not the detailed description, are intended to particularly point out subject matter regarded as the invention, including certain but not necessarily all of the aspects and alternatives described in the detailed description.

Systems and methods are provided herein for real-time assessment of one or more microbial characteristics, such as biomass or microbial activity, in a growing medium, such as soil. Such assessments may be performed by monitoring biodegradation of a microbially degradable material in contact with the growing medium. This may be monitored by measuring electrochemical properties of the microbially degradable material, in contrast to the CSA method which monitors changes in mechanical properties. For example, bacteria in the growing medium may cause physical degradation of the microbially degradable material that may result in a measurable decrease in differential impedance thereof.

The systems use one or more pairs of sensors capable of being located in a growing medium and providing a differential impedance readout therefrom. One of the sensors (referred to herein as a sensing sensor) includes a sensing element formed of a microbially degradable material, and provides a quantification of the rate of degradation of the sensing element. The other sensor (referred to herein as a control sensor) is used as a reference and measures any changes in the electrical resistance of the growing medium over time. This twin sensing arrangement is provided to remove interference and noise measurements from the environment.

The sensing sensor may include a thin layer of a film formed of a microbially degradable material coated on, for example cast onto, an interdigitated electrode (IDE) structure. Such IDEs may be fabricated using well established circuit/sensor manufacturing and assembly techniques which are well known in the art and therefore will not be discussed in any detail herein. Such IDEs provide the ability to measure the changes in electrical properties of the film during degradation thereof.

In certain embodiments, the microbially degradable material may be a cellulose material. The systems and methods may include monitoring electrical impedance to assess a rate of degradation of the cellulose material as a means of non-destructively assessing microbial activity within a targeted ecosystem. In such embodiments, pores are formed on the surface of the cellulose material as a result of the degradation process that cause a decrease in the differential impedance of the system.

A nonlimiting cellulose material that may be used in the systems and methods disclosed herein includes cellulose acetate (CA). CA is believed to be a particularly suitable alternative to the cotton strips traditionally used in the CSA method. CA is the acetyl ester of cellulose that includes the same glucose chain, with some of the hydroxyl groups replaced with acetyl groups. The thermoplastic nature of the ester throughout the polymer chains makes CA an excellent material for processing into different functional films via thermal extruding, casting, and electrospinning. Using such fabrication approaches, CA has been used in a wide range of applications as functional biodegradable films and bioresorbable plastic containers and packaging. In addition, CA has been used in the health industry to create nanofiber structures for controlled release of therapeutics.

Accelerated degradation of CA-based materials occurs in microbe-rich environments, which can be measured by monitoring changes in mass and decomposition gas. Bacteria enzymatically degrade CA by hydrolyzing the crystalline cellulose regions using cellobiohydrolases as well as the amorphous regions using endoglucanases. This process yields monomeric glucose units which serve as nutrients for several organisms.

Other suitable but nonlimiting cellulose materials that may be used in the systems and methods disclosed herein include various biopolymers, such as but not limited to chitin and lignin. The cellulose material used may be chosen to determine enzyme activity of specific microorganisms in media.

The systems disclosed herein may be used for real-time assessment of microbial biomass or microbial activity in soil for agricultural purposes in-situ at the soil site, such as a field or other soil site. Methods of using the systems may include inserting and/or burying one or more pairs of the control and sensing sensors in the soil, for example, at various locations on a farm. Measurements obtained by the control and sensing sensors simultaneously over a time period may be received and recorded. For example, the system may include transmitters, such as wireless transmitters, for transmitting the measurements from the sensors to a computer system, which may be located remote from the sensors. However, in some arrangements the computer system could be physically connected with the sensors. Once received, one or more programs run by or otherwise associated with the computer system, such as by computer software and/or hardware, may be configured and utilized to analyze the recorded measurements to identify changes in the electrical resistance of the growing medium and changes in the electrical impedance of the sensing element over the time period, determine a rate of degradation of the sensing elements of the sensing sensors over the time period based on the identified changes, and determine microbial characteristics, such as biomass and/or microbial activity, in the growing medium, such as a rate of growth of microorganism therein, such as the bacteria, based on the rate of degradation of the sensing elements. Such assessments may promote efficiency on the farm, such as optimization of fertilizer application. Such methods may be used in non-agricultural applications as well, including but not limited to environmental and medical applications. It is understood that the computer system may include any number of processors, may be in a single location, and/or may be decentralized and interconnected, for example by a LAN, WAN, or internet connection. The computer system preferably includes a user interface configured to provide the results to a user, such as on a visual display or a printout.

Nonlimiting embodiments of the invention will now be described in reference to experimental investigations leading up to the invention. In these investigations, the performance and feasibility of the sensors discussed herein were tested by monitoring the level of activity of *Pseudomonas aeruginosa* (ATCC 25668) in a liquid culture environment. *P. aeruginosa* was selected as the bacteria for these investigations due to its significant presence in agricultural soil and previously proven ability to degrade CA under aerobic conditions. The results of these investigations indicate that the sensors offer the capability of performing real-time electrical measurement of cellulose material film degradation, and further indicate that such measurements are directly correlated with an increase in bacteria population and activity. However, the invention is believed to be applicable to measuring characteristics of a wide range of microorganisms, including various types of bacteria, in various types of growing media, including soil.

FIGS. 1A and 1B depict a nonlimiting system 100 for detecting microbial characteristics, such as biomass and/or microbial activity, in a growing medium 102. In this arrangement, the growing medium 102 is an aqueous solution used for purposes of measurement and testing. However the growing medium 102 may be soil or another type of medium in which microorganisms could grow to form a biomass and or exhibit microbial activity. The system 100 includes a pair of sensors, a control sensor 104 and a sensing sensor 106, submerged into the growing medium 102, which in this example is a solution mixture of lysogeny broth (LB) and phosphate buffer solution (PBS) as a culture media for bacteria. The sensing sensor 106 includes an IDE 108 coated with a microbially degradable film 110, in this example a CA film, for use as the sensing element (referred to in the figures as the sensing IDE). The control sensor 104 has an IDE 112 without the sensing element (referred to in the figures as the control IDE). The sensing IDE 108 provides a quantification of the rate of CA degradation, while the control IDE 112 measures any changes in the culture medium 102 over time. By using high frequency (about 10 kHz) measurements, the total impedance readings on the control IDE 112 should be dominated by the electrical proprieties of the growing medium 102, rather than bacterial attachment and activity, providing an adequate baseline for the differential impedance measurement.

FIG. 1A represents initial conditions of both the sensing 108 and control 112 IDEs prior to being exposed to bacteria in the growing medium 102. FIG. 1C represents a cross-sectional view of the sensing IDE structure in FIG. 1A with an intact CA film 110 on the electrodes 108 and its equivalent circuit model. The interface between the sensing IDE 108, the film 110, and the culture medium 102 is modeled as a series combination of the impedance at the electrode/film interface ($Z_{int}$), the impedance of the film ($Z_{film}$), and the culture medium resistance ($R_{sol}$). The relative degradation level of the film 110 with bacterial activity ($Z_{diff}$) may be deduced by subtracting the measured complex impedance readings from the sensing IDE and the control IDE, expressed with the following equations:

$$Z_{control} = R_{control} + jX_{control} \quad (1)$$

$$Z_{sense} = R_{sense} + jX_{sense} \quad (2)$$

$$Z_{diff} = Z_{sense} - Z_{control} \quad (3)$$

$$|Z_{diff}| = \sqrt{(R_{sense} - R_{control})^2 + (X_{sense} - X_{control})^2} \quad (4)$$

Where $R_{control}$ and $X_{control}$ are the measured real and imaginary portions of the complex impedance readings of the control IDE ($Z_{control}$), and $R_{sense}$ and $X_{sense}$ are the real and imaginary portions of the complex impedance readings of the sensing IDE ($Z_{sense}$). The absolute change in differential impedance measurement ($Z_{diff}$) accounts for changes in both resistive and capacitive elements on the sensing IDE 108. FIG. 1B represents the sensing IDE 108 after inoculation and incubation with bacteria in the test growth medium 102. As shown in FIG. 1D, the growth in bacterial concentration leads to an increase in the cellulolytic activity and physical degradation of the film 110, which translates to an overall decrease in the differential impedance measurements.

Figure 2:
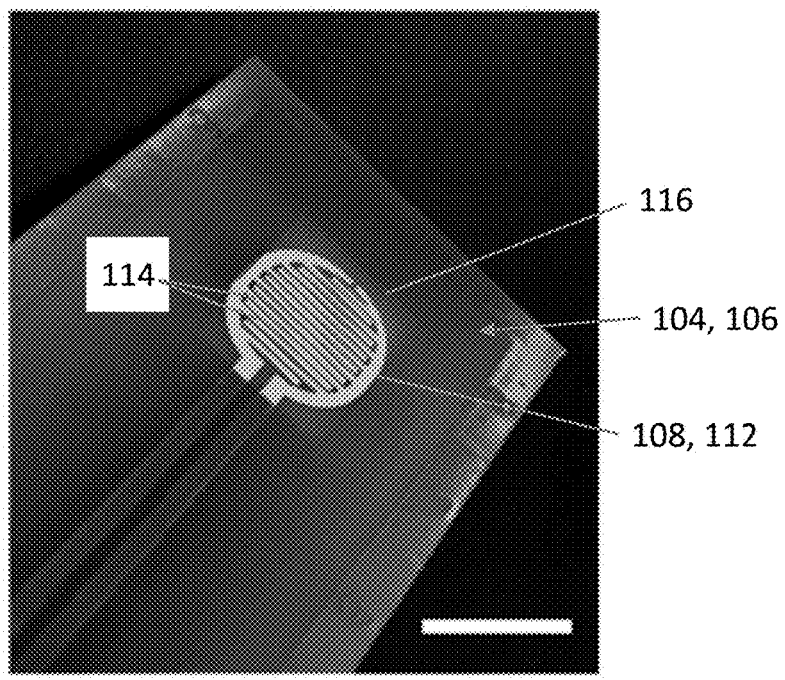
FIG. 2 is an image of an exemplary IDE (scale bar: 10 cm).
Figure 3:
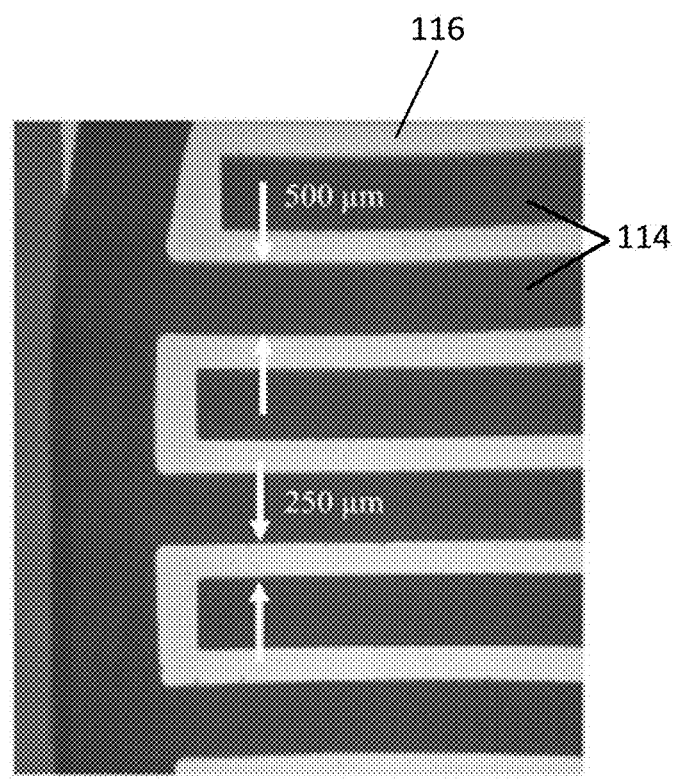
FIG. 3 is an image showing an enlarged view of nickel interdigitated electrodes (finger electrodes) on the IDE of FIG. 2.

The control sensor 104 and the sensing sensor 106 were fabricated for use in a system of the type represented in FIGS. 1A and 1B. FIG. 2 shows a representative sensor 104 and/or 106. As also seen in FIG. 3, the sensing area of the sensors 104 or 106 included an array of interdigitated nickel electrodes 114 (referred to herein as "finger electrodes") having a thickness of about 50 μm, a width of about 500 μm, and a spacing of about 250 μm. The finger electrodes 114 were fabricated on a standard substrate 116, which in this example was formed of a composite material including woven fiberglass cloth and a flame-resistant epoxy resin binder (FR-4 TG130). Two interconnections to the IDEs 108 and 112 were passivated with a water-resistant epoxy layer. A microbially degradable CA solution was prepared by dissolving 282 mg of CA powder in 6.5 mL of acetone and mixing for twenty minutes at 2000 RPM.

Prior to depositing the CA solution onto the sensing IDEs 108, the surface of the substrate 116 adjacent the finger electrodes 114 was functionalized through a salinization treatment to enhance adhesion of the film to the substrate. In this process, the sensing IDEs 108 were sonicated for ten minutes in a 100% IPA solution to remove any residue or contaminates left on the surface thereof during manufacturing process. The sensing IDEs 108 were dried using a nitrogen gun followed by an air plasma treatment at 480 mTorr for two minutes to activate the surface. An initial plasma treatment was performed to increase the hydrophilicity and wettability of treated surfaces by increasing the number of reactive, oxygen-containing functional groups on the surfaces, thus increasing the surface energy on the surfaces of the substrates. The sensing IDEs 108 were then submerged in a 1:10 ratio solution of 3-Aminopropyltri-ethoxysilane (APTES) and deionized (DI) water for two hours. The sensing IDEs 108 were then dried using the nitrogen gun and a secondary plasma treatment was performed on the sensing IDEs 108 for an extra ten seconds.

A computer system 120 is operatively connected with the control sensor 104 and the sensing sensor 106. The computer system 120 is configured to obtain measurements from the sensors 104 and 106 as well as determine various characteristics of the sensors and of the growing medium, for example in a manner as generally described elsewhere herein. Preferably, the computer 120 is configured to determine a characteristic of the bacteria in the growing medium based on a resistance of the growing medium 102 and an impedance of the sensing element 108 as measured by the control sensor 104 and the sensing sensor 106. In some arrangements, the computer system 120 is configured to determine an amount of the bacteria in the growing medium based on the state of degradation. For example, the computer system 120 may be configured to receive measurements obtained by the control sensor and the sensing sensor simultaneously, analyze the measurements to determine a resistance of the growing medium and an impedance of the sensing element, determine a state of degradation of the sensing element based on the resistance of the growing medium and the impedance of the sensing element, and determine an amount of the bacteria in the growing medium based on the state of degradation. In some arrangements, the computer system 120 is configured to determine a rate of growth of the bacteria in the growing medium. For example, the computer 120 may be configured to receive multiple measurements obtained by the control and sensing sensors 104 and 106 simultaneously over a time period, analyze the measurements to identify changes in the resistance of the growing medium and changes in the impedance of the sensing element over the time period, determine a rate of degradation of the sensing element over the time period based on the identified changes, and determine a rate of growth of the bacteria in the growing medium based on the rate of degradation. The computer system 120 may be configured to determine both an amount of the bacteria in the growing medium and a rate of growth of the bacteria in the growing medium or only one of the amount and rate of growth. The computer system 120 may optionally be configured to make other determinations and/or calculations based on measurements received from one or both of the sensors 104 and 106 and/or data from other sources, as well as provide other output.

Figures 4A, 4B, 4C:
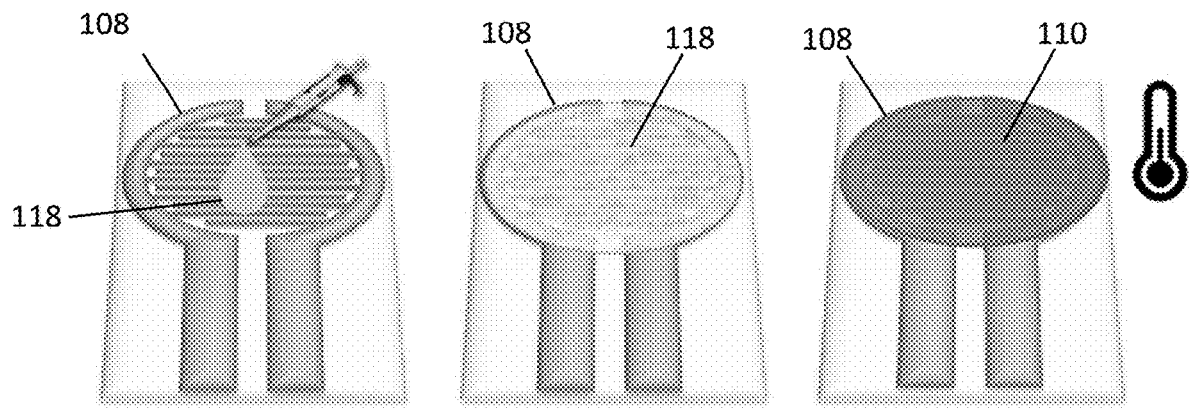
FIGS. 4A, 4B, and 4C are schematic representations of fabrication of a CA film coating on a sensing IDE, including drop casting a CA solution onto a sensing area of an IDE (FIG. 4A), spin coating the IDE to form a uniform coating (FIG. 4B), and thermal curing to form the CA film (FIG. 4C).

As best seen in FIGS. 4A-4C, the films 110 were prepared by drop casting 200 of the dissolved CA solution 118 onto the sensing area (FIG. 4A) and spin coating the sensing IDEs 108 at 1500 rpm for 30 seconds (FIG. 4B). The sensing IDEs 108 were then placed in an isothermal oven at 80° C. for twenty minutes to allow complete drying and curing of the film 110 and forming a uniform 50 µm coating (FIG. 4C).

The control IDEs 112 were prepared by sonicating in 100% IPA and drying at room temperature without any further modification.

Test samples were prepared by casting films 110 on sensing IDEs 108 generally as described above in reference to FIGS. 2 and 3. However, in order to assess the surface and structural properties of the films 110, the samples were fabricated with varying versions of the pre-deposition surface treatment process described in reference to FIGS. 4A through 4C. Specifically, samples were produced without surface treatment prior to deposition of the film ("untreated"), with only the initial plasma treatment prior to deposition ("plasma treated"), with both the initial plasma treatment and the subsequent APTES treatment but without the secondary plasma treatment prior to deposition ("APTES treated"), or with all of the surface treatments noted above prior to deposition, that is, with the initial plasma treatment, the APTES treatment, and the secondary plasma treatment ("APTES+plasma treated"). A series of experiments were carried out on these samples to assess and improve film attachment onto the substrates 116 and finger electrodes 114.

Contact angle measurements were obtained to assess the surface energy of the test samples. A micropipette was used to carefully release a 10 µL water droplet onto the surface of each sample, and resulting contact angles were determined and reported as left, right, and average contact angles. The average surface contact angle of the untreated samples after cleaning in a 100% IPA solution was measured at 70°. The initial plasma treatment resulted in higher wettability with an average 40° decrease in contact angle compared to the untreated samples. The higher wettability can be visually assessed by observing how the droplet spreads more readily across the surface. Plasma treatment increased wettability by deposition of reactive oxygen species on the electrode surface, which increases the surface energy. A subsequent 30° increase in contact angle after the APTES treatment was attributed to the layered deposition of silane groups on the electrode surface. The slight increase in average contact angle occurred due to the hydrophobic nature of the triethoxysilane groups $(Si(OEt)_3)$ deposited on the surface and was used to confirm a success of treatment. After plasma activation of the APTES treated surfaces, the contact angle decreased once more to 7°, which occurred due to hydrolyzing at the free end of the triethoxysilane groups bonded onto the surface of the substrate, thus forming high surface energy silanol (Si—OH) groups on the exposed surface.

Film adhesion properties of an APTES+plasma treated sample was assessed relative to an untreated sample using a tape peel adhesion strength test. Specifically, a transparent, pressure-sensitive adhesive tape (5×1 cm, 3M Scotch™ tape) was placed on the electrode surface and subsequently peeled off to test the adhesion of the films to the substrates of the samples.

Adhesion tests were performed for an untreated electrode and for an electrode treated with APTES and plasma. Results showed a clear distinction between the untreated and APTES+Plasma treated surfaces. The CA film was completely removed from the untreated electrode due to poor attachment. In contrast, the CA film was completely intact once the tape was removed due to the improved attachment achieved by the electrode surface functionalization with the APTES+Plasma treatment. These investigations confirmed the benefits of the pre-deposition surface treatments during the fabrication process of the sensing IDEs 108, and specifically indicated that such treatments promote improved adhesion between the film 110 and the substrate 116 via strong chemical bonding.

The thermal properties of the films 110 were characterized at different processing stages. Test samples included CA powder, CA solution (5 wt %) comprising a mixture of the CA powder in acetone, and film formed from the CA solution.

Thermogravimetric analysis (TGA) was used to determine the amount of bound solvent in the film 110. TGA was performed by applying a heating step from 25° C. to 500° C. at a rate of 25° C./minute to test samples fabricated as described above in reference to FIGS. 2 through 4. The samples were prepared by loading about 5 mg of the sample into a TGA crucible. The CA powder was analyzed using this technique to establish the baseline properties of the solvent-free material. The CA solution was analyzed as prepared as described above to visualize the volatilization of the solvent within the liquid mixture. The TGA results were used to determine the presence of solvent after casting and drying of the films which could compromise bacterial growth or interfere with the impedance measurements. The initial decrease in weight on the CA solution curve indicated removal of volatile acetone boiling out of the film at around 40° C. and ending at around 70° C. This was consistent with the boiling point of acetone at 57° C. The curve for the film showed no decrease in mass in the range of 40° C. to 70° C. which was consistent with the curve for the CA powder in terms of weight loss, suggesting that there was no significant amount of solvent remaining in the prepared CA film and that the majority of the mass in the CA film was made up by cellulose acetate. It was observed, in all three curves, a period of significant weight loss started at around 300° C. and ended close to 400° C. This massive weight loss can be attributed to the degradation of the polymer, which explains its consistency across all three samples.

Differential scanning colorimetry (DSC) was used to compare the thermal properties of the film and the CA powder. DSC was performed by exposing the samples to a heating cycle of increasing temperature from 25° C. to 300° C., at 25° C./minute. The results were used to determine and compare the glass transition temperature and the melting temperature of both materials. The glass transition temperature was observed as a first peak at 175° C. while the melting temperature was observed as a second peak at 225° C. Based on the alignment of the peaks in both specimens, it was determined that the dissolution and casting processing used to produce the film did not significantly affect the thermal properties of the material.

Figure 5:
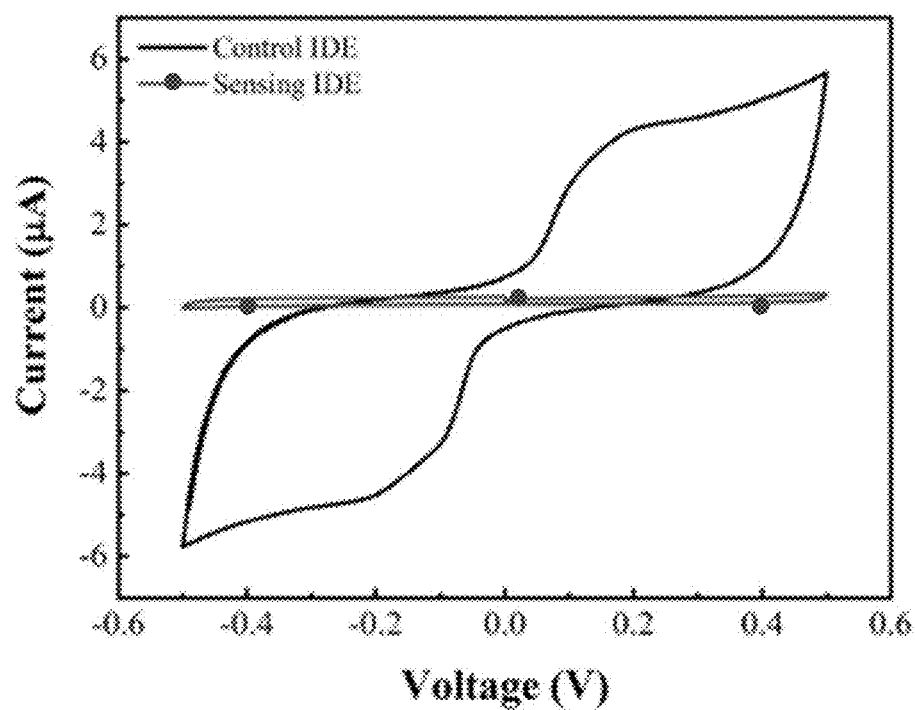
FIG. 5 is a CV plot of the sensing IDE versus the control IDE in a 10% solution of ferrocyanide.

In order to understand the sensing sensor's 106 response during degradation, it was necessary to understand the electrochemical behavior of the sensing IDE 108 with an intact and fully degraded film coating 110. Therefore, electrochemical impedance characterizations of the control and sensing IDEs 112 and 108 were performed. Cyclic voltammetry (CV) was used to determine the passivating effects of the film 110 on the peak current of the samples. CV was measured using a 5 mM solution of potassium ferrocyanide diluted in PBS to analyze the passivation behavior of the film 110 deposited onto the sensing IDEs 108. For this measurement, the voltage was swept at a scan rate of 10 mV/s in the potential range of −0.5 to 0.5 V. One of the IDE poles was connected to a sense probe, while the other pole was connected to both reference and counter electrodes of a Potentiostat analyzer. FIG. 5 shows the curves for both the sensing IDE 108 coated with the film 110, and a non-coated control IDE. The results confirmed a significant decrease in peak current between the current passing through the sensing IDE 108 as compared to the control IDE. The peak current of the sensing IDE 108 was 0.25 µA, sixteen times lower than the peak current of the control IDE with 4 µA. These results suggested that the film 110 acts as an insulator on the surface of the sensing IDEs 108. Therefore, degradation of the film should result in a decrease in the total impedance.

Figure 6:
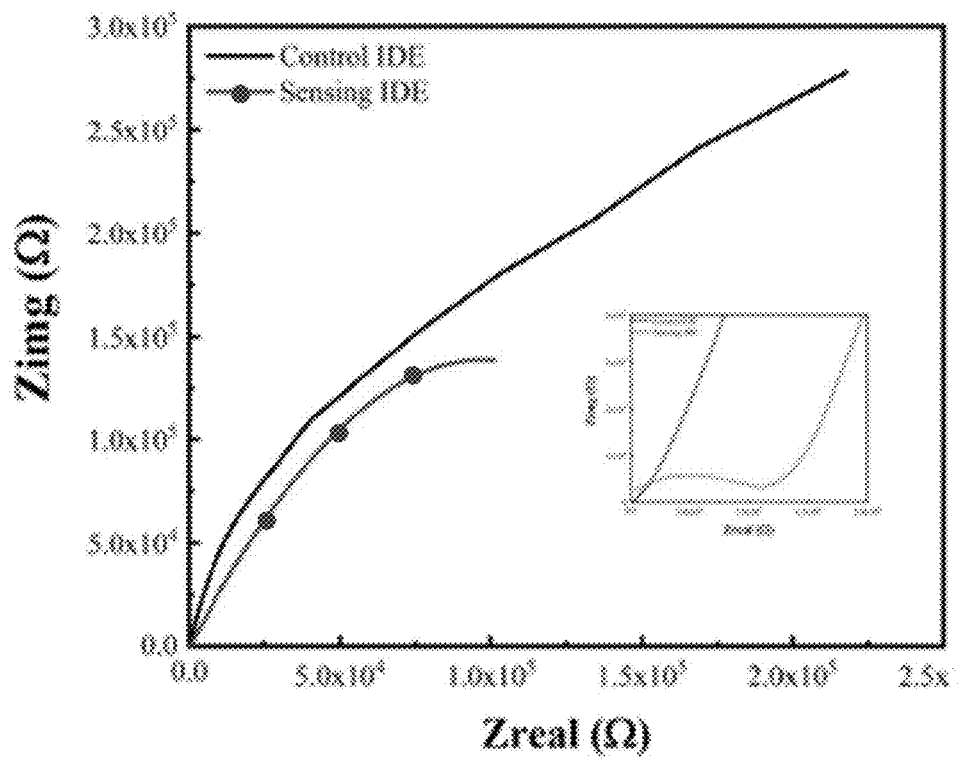
FIG. 6 is a Nyquist plot of the sensing IDE versus the control IDE in a LB/PBS solution.

Electrochemical impedance spectroscopy (EIS) was also used to characterize differences between the sensing IDEs 108 and the control IDEs 112 due to the presence of an insulating layer. IDEs were characterized through EIS in a three-electrode configuration that was achieved by only connecting one of the terminals on the IDE to a working probe on a potentiostat and using a commercial Ag/AgCl reference electrode as reference, and a platinum wire as the counter electrode. A sine-modulated AC potential with an amplitude of ±10 mV was applied between the working and reference electrodes. The frequency was swept from 0.1 Hz to 100 kHz. Changes in impedance due to the increase in bacterial concentration, however, were measured at a fixed frequency of 10 kHz for both the control and sensing IDEs by applying a sine-modulated AC potential with an amplitude of ±10 mV in a two-electrode configuration. In this configuration, one of the terminals of the IDE was connected to the working probe of the potentiostat, while the other terminal of the IDE was connected to both reference and counter probes on the potentiostat. The differential impedance of sensors in aqueous environments was measured every eight hours for a total testing period of forty-eight hours. The differential impedance of sensors in soil samples was tested every day for five days. FIG. 6 represents a representative Nyquist plot that indicates a distinct difference between coated sensing IDEs 108 and bare control IDEs. The small kinetic region observed at high frequencies on the Nyquist plot of the sensing IDEs 108 was a result of the presence of the insulating CA film on the electrode surface.

For detection in aqueous media, a bacterial stock solution consisting of 100% Lysogeny Broth (LB) was inoculated with *P. aeruginosa* and left to incubate under aerobic conditions overnight at 37° C. Each experiment was carried out using different mixtures of LB/PBS as well as different temperatures. By varying parameters such as temperature and nutrient availability, different microbial growth rates were achieved. The different percentages of LB included 1%, 10%, and 20% LB in PBS. The 1% LB experiments were carried out at 25° C. and 37° C. Each experiment was carried out in separate containers consisting of 60 mL of the predetermined LB/PB S mixture followed by inoculation with 50 µL of the bacterial stock solution followed by placement of sensing and control IDEs into the culture container. The containers were placed on a rocking platform and incubated for forty-eight hours under aerobic conditions. The concentration of bacteria, reported in CFU/mL, was measured every eight hours to assess an increase in microbial activity throughout the forty-eight-hour period. Colony Forming Units (CFU) counts were taken by performing a five-series dilution of samples in a solution of 100% LB, and plating colonies onto petri dishes prepared with an LB/agar mixture.

SEM images of the as-prepared CA film and a CA film in a LB/PBS solution with no bacteria clearly showed no distinct differences between the surfaces of the films, which suggested that there was no degradation due to exposure to the media. An SEM image of the surface of a CA film in a LB/PBS solution with inoculated with *P. aeruginosa* indicated that, after two days, bacteria had proliferated on the surface of the film. In order to visualize the degradation caused by the bacteria on the surface of the CA film, the bacteria were removed from the surface and SEM imaging was repeated, which showed the physical degradation on the surface of the CA film caused by the bacteria. Holes, spread throughout the film, were made by the bacteria as they degraded the CA film. These results confirmed the physical degradation caused by the bacteria on the film as they breakdown cellulose for their metabolic activity.

Figure 7:
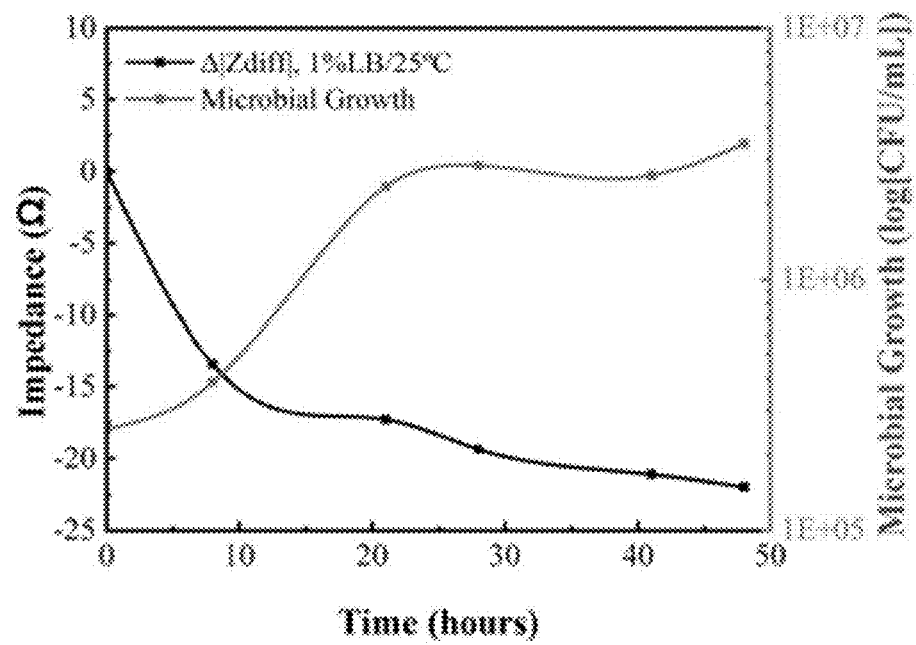
FIG. 7 is a graph showing changes in differential impedance ($\Delta|Z_{diff}|$) readings and changes in microbial concentration (log[CFU/mL]) for a sensor in 1% LB/PBS solution over a 48-hour period, incubated at 25° C., which showed the smallest decrease in differential impedance of 22 ohms with a one-order of magnitude increase in microbial concentration.
Figure 8:
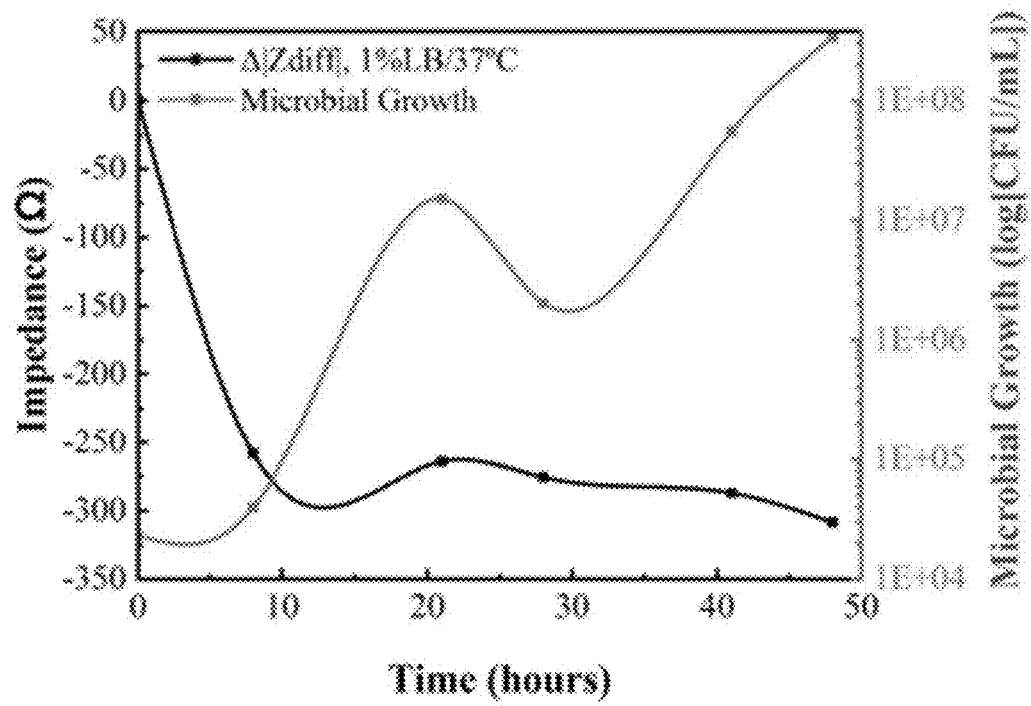
FIG. 8 is a graph showing changes in differential impedance ($\Delta|Z_{diff}|$) readings and changes in microbial concentration (log[CFU/mL]) for a sensor in 1% LB/PBS solution over a 48-hour period, incubated at 37° C., which showed the largest decrease in differential impedance of 309 ohms with a four-order of magnitude increase in microbial concentration.
Figure 9:
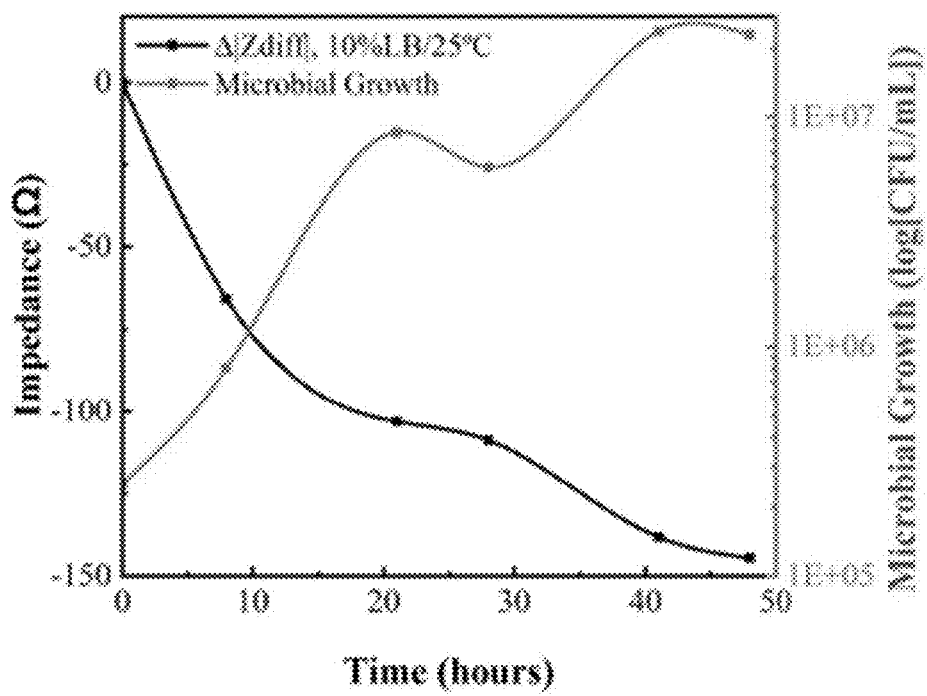
FIG. 9 is a graph showing changes in differential impedance ($\Delta|Z_{diff}|$) readings and changes in microbial concentration (log[CFU/mL]) for a sensor in 10% LB/PBS solution over a 48-hour period, incubated at 25° C., which showed a decrease in differential impedance of 144 ohms with a two-order of magnitude increase in microbial concentration, from 2.5E5 to 2.3E7.
Figure 10:
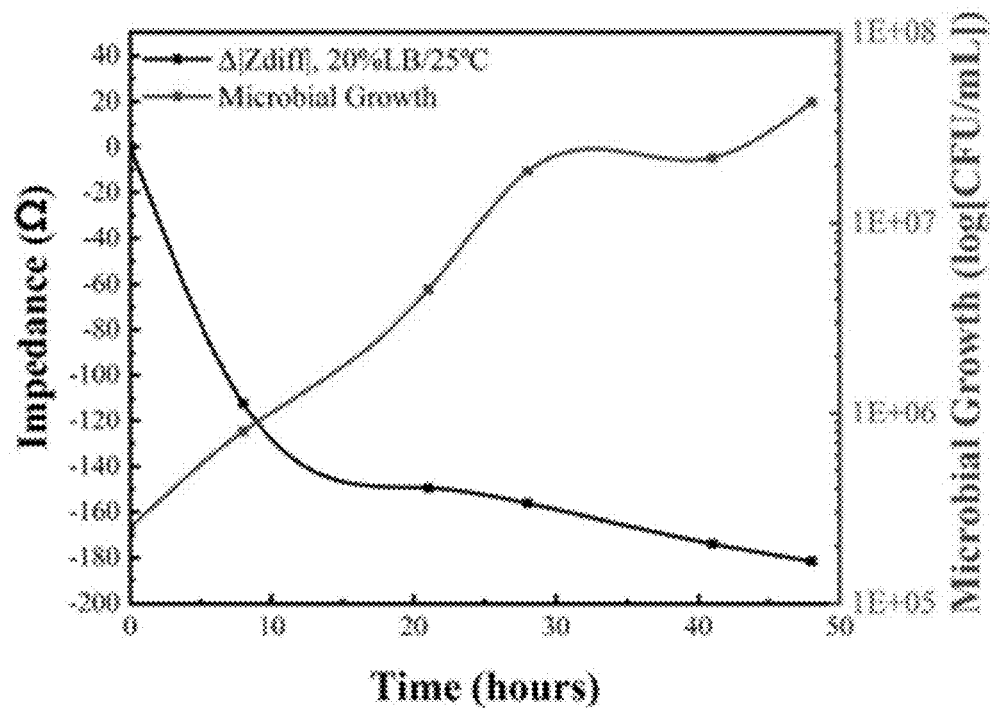
FIG. 10 is a graph showing changes in differential impedance ($\Delta|Z_{diff}|$) readings and changes in microbial concentration (log[CFU/mL]) for a sensor in 20% LB/PBS solution over a 48-hour period, incubated at 25° C., which showed a decrease in differential impedance of 182 ohms with a two-order of magnitude increase in microbial concentration, from 2.5E5 to 4.3E7.

FIGS. 7 through 10 represent impedimetric measurements of the CA degradation taken from control and sensing IDEs 112 and 108 in aqueous growth media 102 inoculated with *P. aeruginosa*. The electrochemical impedance measurements are shown on the left y-axis for four conditions. The differential impedance reading as ($\Delta Z_{diff}$), was calculated by subtracting the impedance measured using the sensing IDEs 108 ($\Delta Z_{sense}$) from the impedance measured using the control IDEs 112 ($\Delta Z_{ref}$), at each time point. The right y-axis displays the different bacterial concentrations, in CFU/mL, over time for each experiment as a result of different culture conditions. All impedance changes in both of the control and sensing IDEs 112 and 108 against bacterial growth time were obtained by applying a sine-modulated AC potential with an amplitude of ±10 mV and fixed frequency of 10 kHz. The impedance was measured every eight hours for a total testing period of forty-eight hours. FIG. 7 shows the total relative changes in differential impedance measurements for the 1% LB solution, inoculated with $2.52 \times 10^5$ CFU/mL, and incubated at 25° C. This experiment resulted in the lowest change in impedance, with a total decrease of 22 ohms, with the slowest growth in bacterial population, reaching a final concentration of $3.4 \times 10^6$ CFU/mL. FIG. 8 shows the results of electrodes in a solution consisting of 1% LB, inoculated with an initial concentration of $2.31 \times 10^4$ CFU/mL, and incubated at 37° C. Despite being inoculated with a lower concentration of bacteria, the final concentration reached $3.5 \times 10^8$ CFU/mL, the largest growth in bacterial population across all experiments. This overgrowth of bacteria was attributed to the optimum incubation temperature which resulted in higher growth rates. This experiment also resulted in a higher change in impedance of the sensor, with a total decrease of 309 ohms. FIG. 9 shows the total change in impedance for electrodes in a solution of 10% LB, inoculated with $2.52 \times 10^5$ CFU/mL, and incubated at 25° C. This experiment resulted in a significantly greater decrease in total impedance, of 144 ohms as compared to the 1% LB culture condition with a higher increase in bacterial growth resulting in a final population of $2.2 \times 10^7$ CFU/mL. FIG. 10 shows the results of the experiment repeated with the same inoculated number of bacteria and incubated temperature with culture medium of 20% LB. In this experiment, the total decrease in impedance reached 182 ohms with a final concentration of bacteria of $5 \times 10^7$ CFU/mL.

Figure 11:
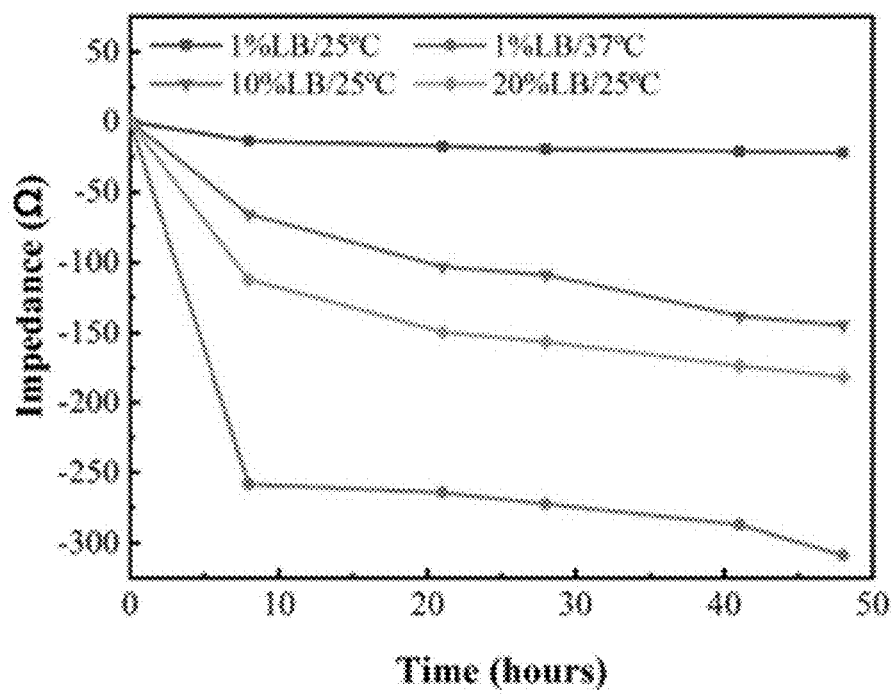
FIG. 11 is a graph showing relative change in differential impedance ($\Delta|Z_{diff}|$) over time for different bacteria culture conditions, including 1% LB/PBS incubated at 25° C., 1% LB/PBS incubated at 37° C., 20% LB/PBS incubated at 25° C., and 10% LB/PBS incubated at 25° C.

FIG. 11 shows an overall change in differential impedance readings of all four conditions over the duration of the experiments as a function of time. These results indicated that the decrease in impedance was larger at all time points for experiments that resulted with higher CFU counts. The results from experiments conducted in a 1% LB solution at different temperatures, indicated that temperature has a stronger influence in bacterial growth compared to nutrient availability. At the same time, these results further indicated that the sensors are more sensitive to bacterial growth rather than conductivity of the media.

Figure 12:
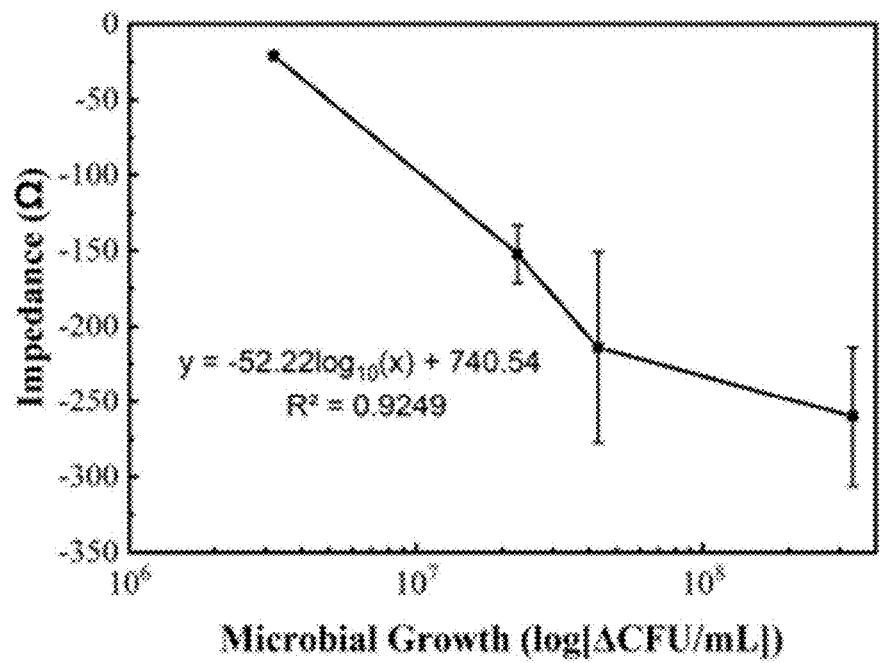
FIG. 12 is a graph showing a linear relationship ($R^2=0.92$) between the logarithmic value of the concentration of bacteria and the differential impedance after 48-hour measurements.
Figure 13:
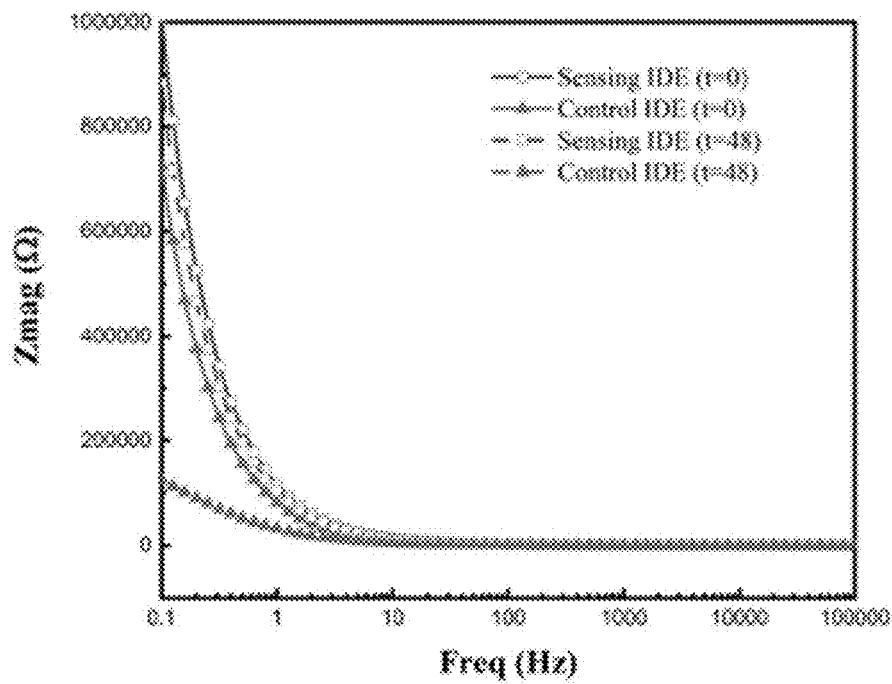
FIGS. 13 through 16 are graphs showing magnitude, phase angle, real component, and imaginary component, respectively, of total impedance measured by sensing and control IDEs versus the frequency spectrum from 0.1 Hz to 100 kHz in solution of 20% LB/25° C. at time t=0 and t=48 hours after inoculation with bacteria.
Figure 14:
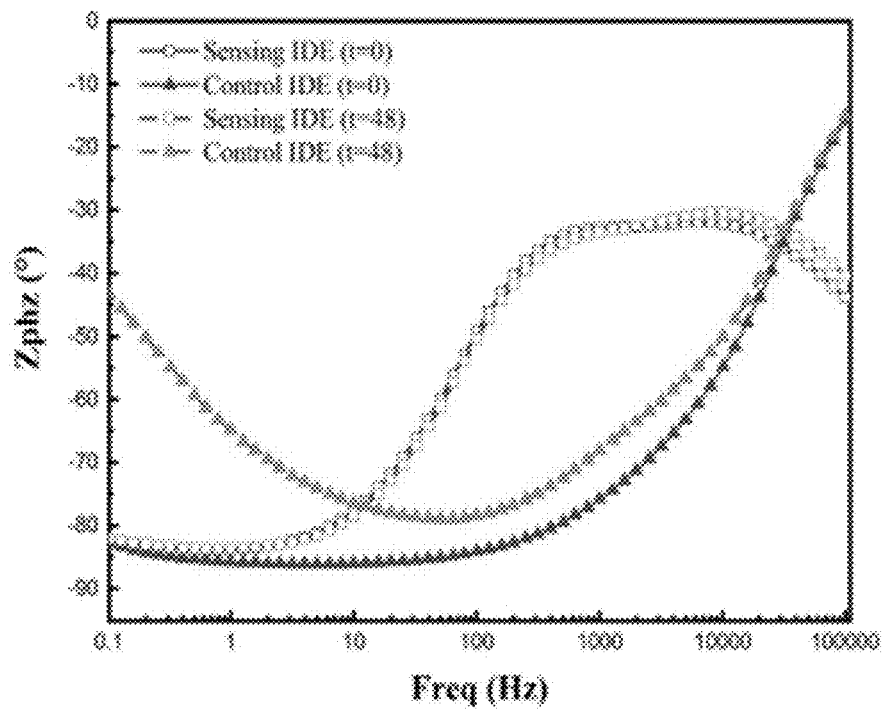
Figure 15:
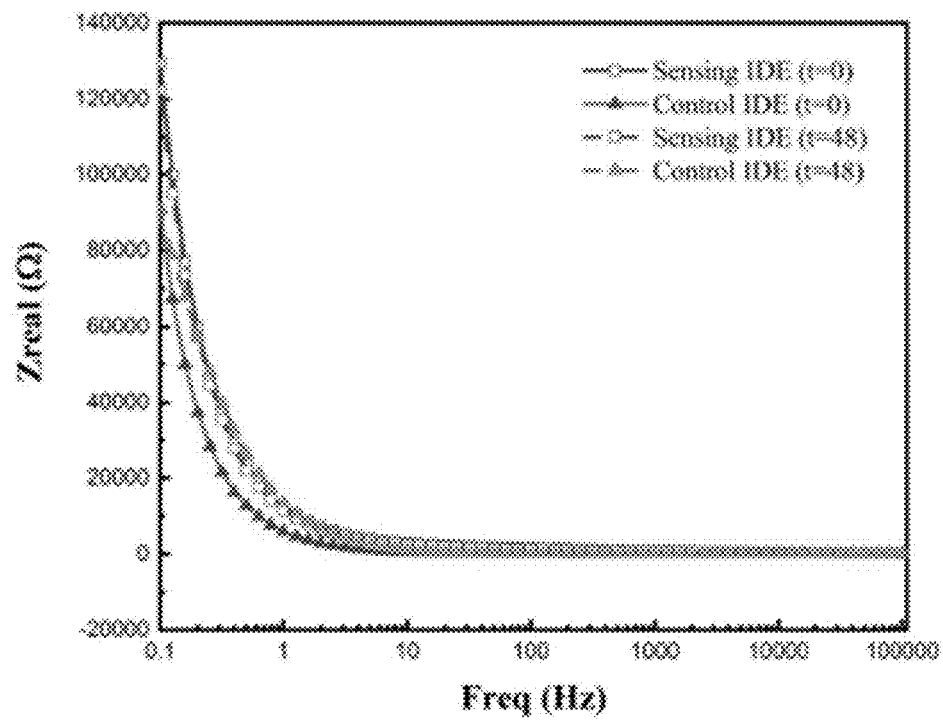
Figure 16:
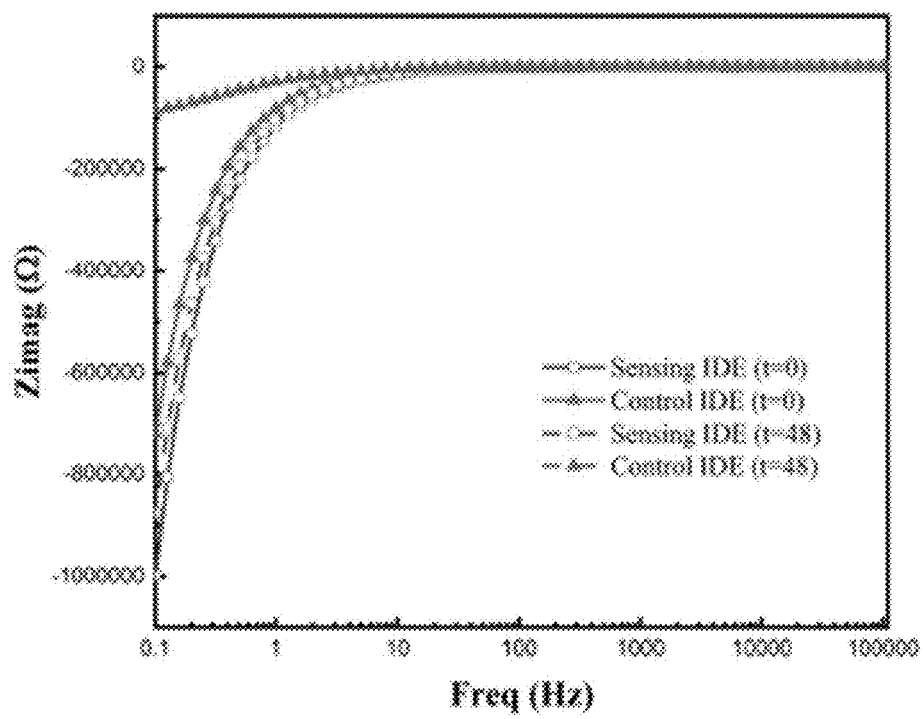
Figure 17:
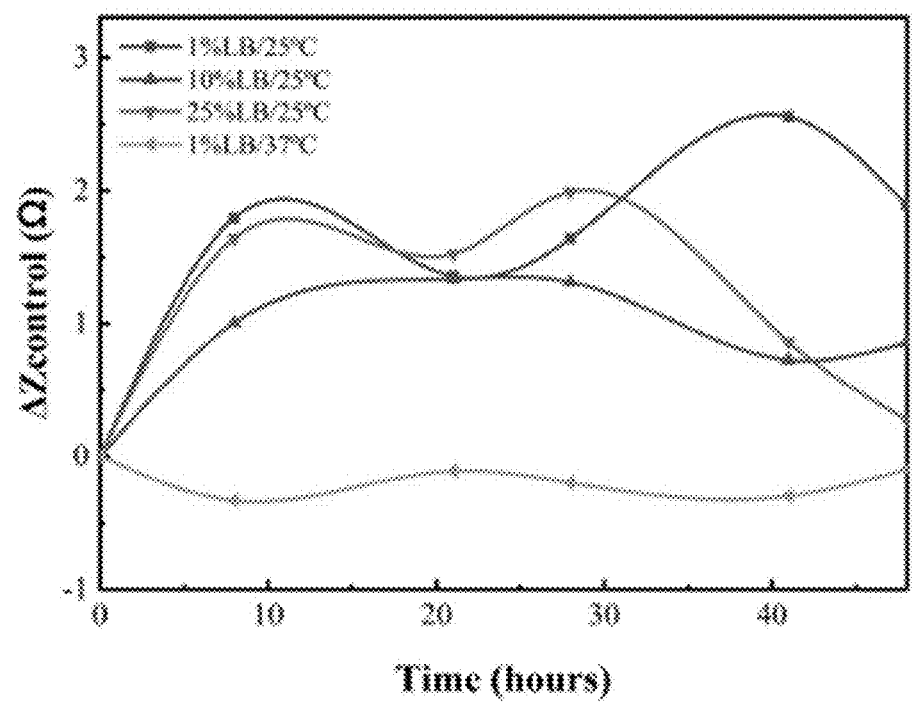
FIG. 17 is a graph showing changes in impedance of control IDEs at 10 kHz in each experimental condition measured over 48-hour period.
Figure 18:
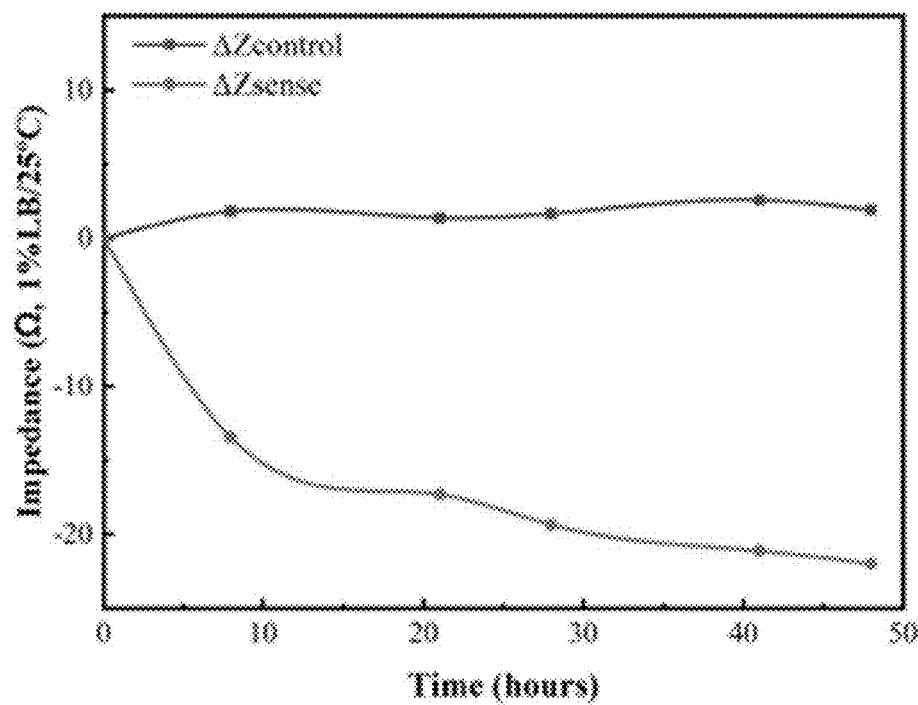
FIGS. 18 through 21 are graphs showing changes in impedance of both control and sensing IDE at 10 kHz over time in bacterial culture conditions of 1% LB/25° C., 10% LB/25° C., 20% LB/25° C., and 1% LB/37° C., respectively.
Figure 19:
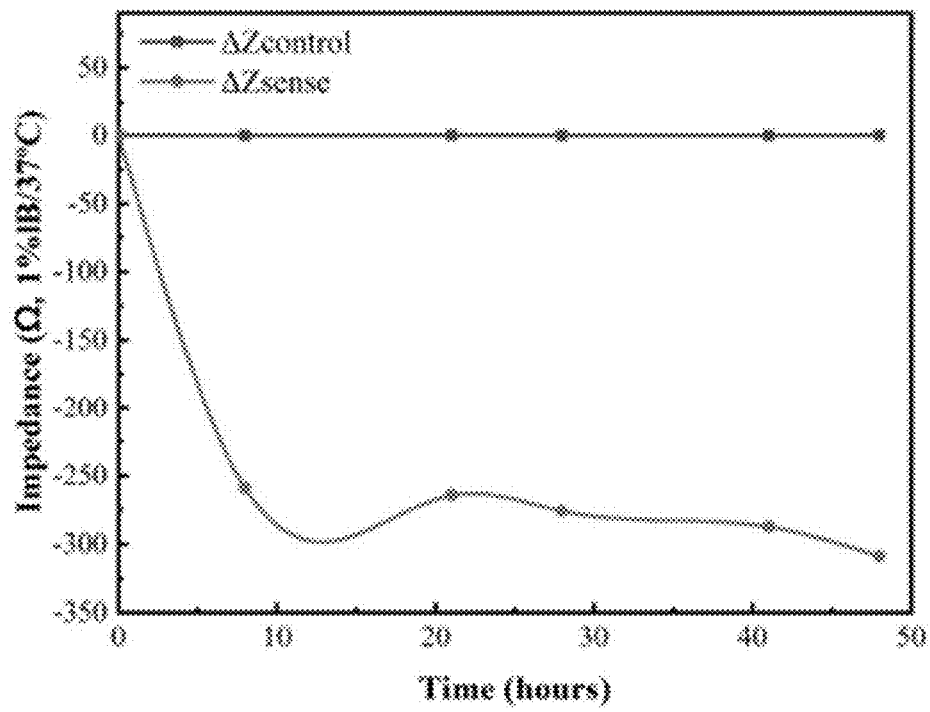
Figure 20:
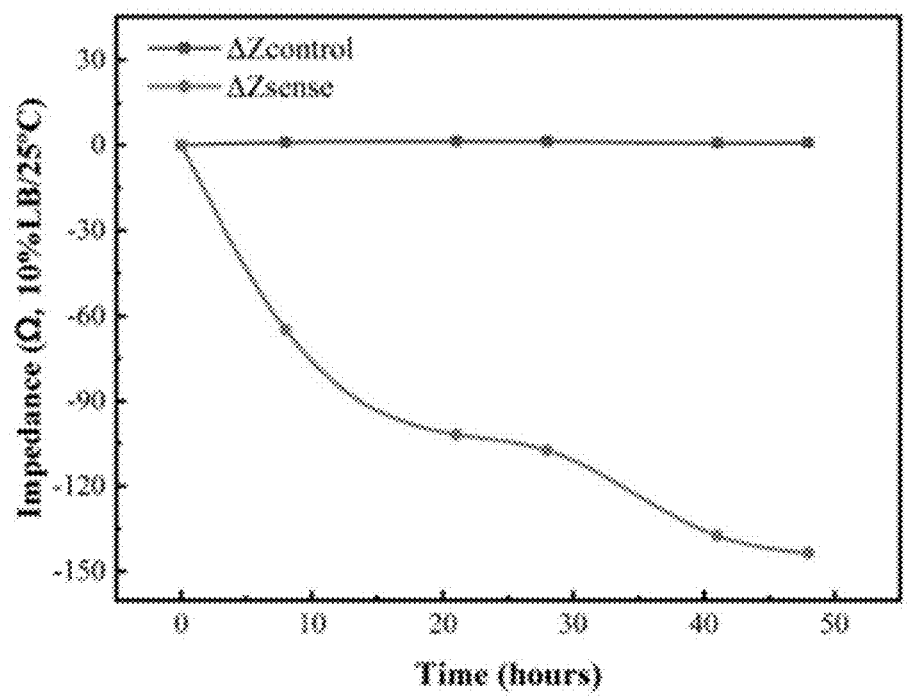
Figure 21:
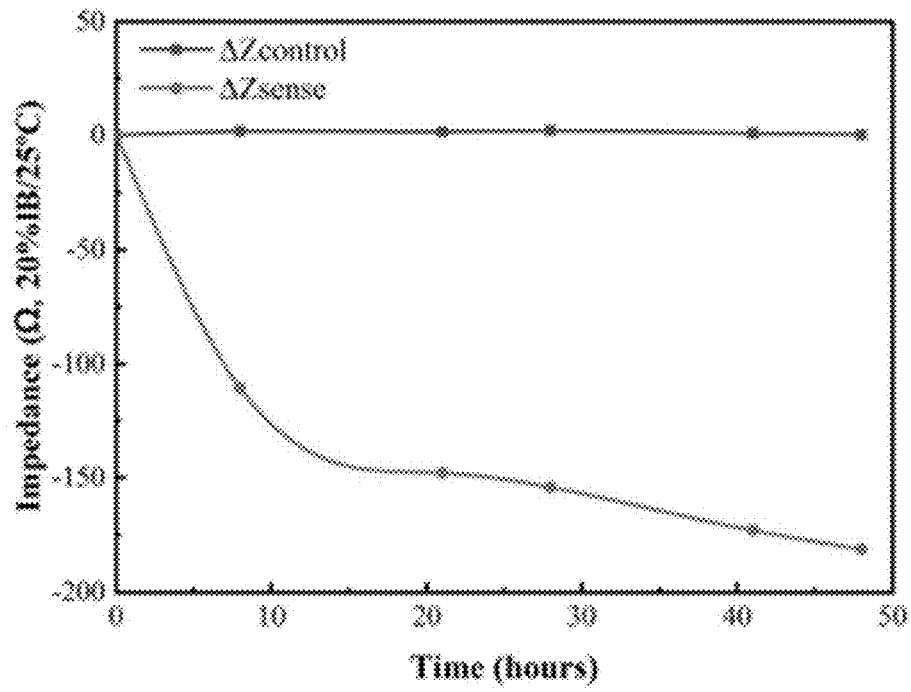

FIG. 12 shows the overall correlation between changes in impedance and increase in number of bacteria after forty-eight hours. The results indicated an overall linear relationship between differential impedance readings from the sensors and the logarithmic value of the concentration of bacteria in CFU/mL, with an average sensitivity of 52.2 ohms/log(CFU/mL).

FIGS. 13 through 16 show results of magnitude, phase, real, and imaginary components, respectively, of the impedance against frequency, from 0.1 Hz to 100 kHz, for sensing and control IDEs 108 and 112 in solutions of 20% LB/PBS at time t=0 and t=48 hours after inoculation with bacteria. Table 51 of FIG. 22 shows the values for magnitude, phase, real, and imaginary components of the impedance measured in the same condition, as well as the results for differential impedance ($|Z_{diff}|$) and relative changes in differential impedance ($\Delta|Z_{diff}|$) readings. Changes in impedance for control and sensing IDEs 112 and 108 across all experimental conditions are shown separately in the supporting information (FIGS. 17 through 21).

As a proof of concept, the performance of the sensor system 100 was assessed in soil environments with high and low levels of microbial activity. The soil was ground using a mortar and pestle and stored in plastic containers. Prior to this process, the mortar and pestle, as well as each container, were rinsed thoroughly with IPA to remove any bacteria on the surface and treated under UV light for 30 minutes before adding the soil samples. The soil samples were then separated into ten containers with 100-grams of soil in each container and separated into two groups to create five experimental replicates of each condition. The soil group with lower level of microbial activity condition were artificially created by autoclave sterilization and labeled as the sterile soil. In this process, the soil samples were placed inside a sterilizer and autoclaved at 121° C. and approximately 15 psi for one hour.

Next the sensing and control IDEs 108 and 112 were placed into sterile and non-sterile (fertile) soil containers, followed by adding 35 mL of water. The added water was to establish the field capacity conditions in the soil samples. Field capacity is defined as the amount of water content held within the soil after excess water has drained and drainage has stopped. Field capacity is typically achieved after rainfall or during average irrigation cycles in agricultural fields. To avoid water evaporation and prevent unwanted contamination, all containers were covered.

The average change in impedance reading from the sensors 106 in each soil condition (sterile and fertile) was recorded every 24 h over the course of five days at room temperature conditions (21° C.). As the ground truth measurements, an enzymatic assay of β-Glucosidase was performed on both soil conditions (sterile and fertile). Enzymatic assays on soil samples were performed on Day 0 and Day 5 of the experiment. The soil samples were taken from the containers at designated time point and incubated in a solution of 0.25 mL of toluene, 4 mL of Modified Universal Buffer (MUB), and 1 mL of a p-nitrophenyl-α or β-D-glucoside (PNG) solutions for one hour at 37° C. After incubation, 1 ml of $CaCl_2$) and 4 ml of Tris buffer pH 12 were added. Soil suspensions were subsequently filtered using Whatman filters 2v. β-Glucosidase activity was measured by concentration of p-nitrophenol.

Figure 23:
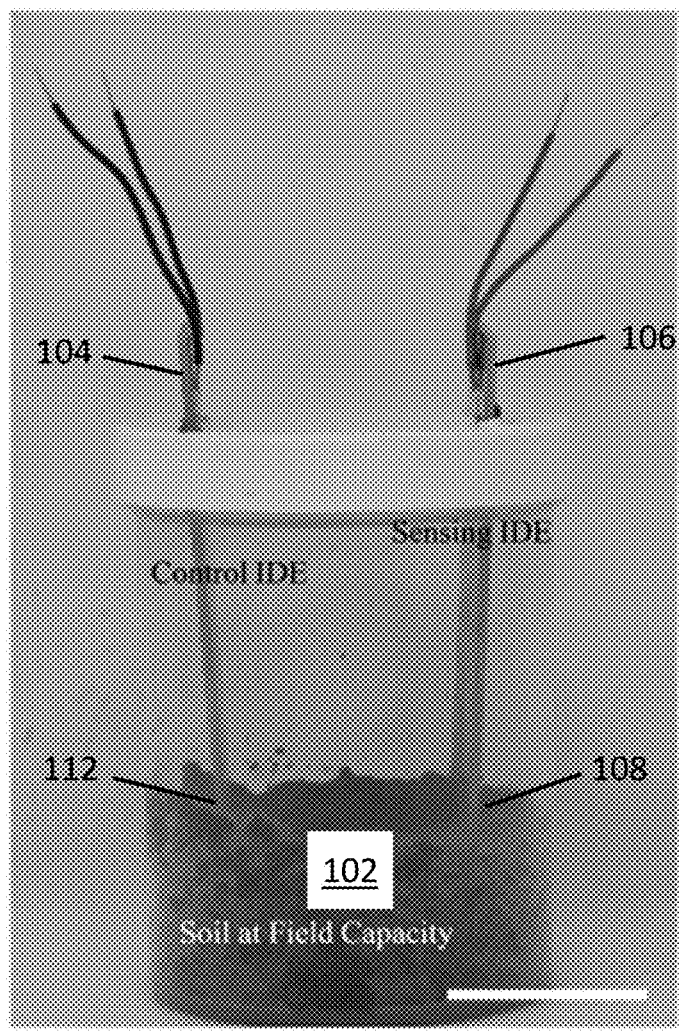
FIG. 23 shows an experimental setup of a soil test experiment according to aspects of the invention. Both control and sensing IDEs were introduced into samples kept at field capacity. The scale bar represents 5 cm.
Figure 24:
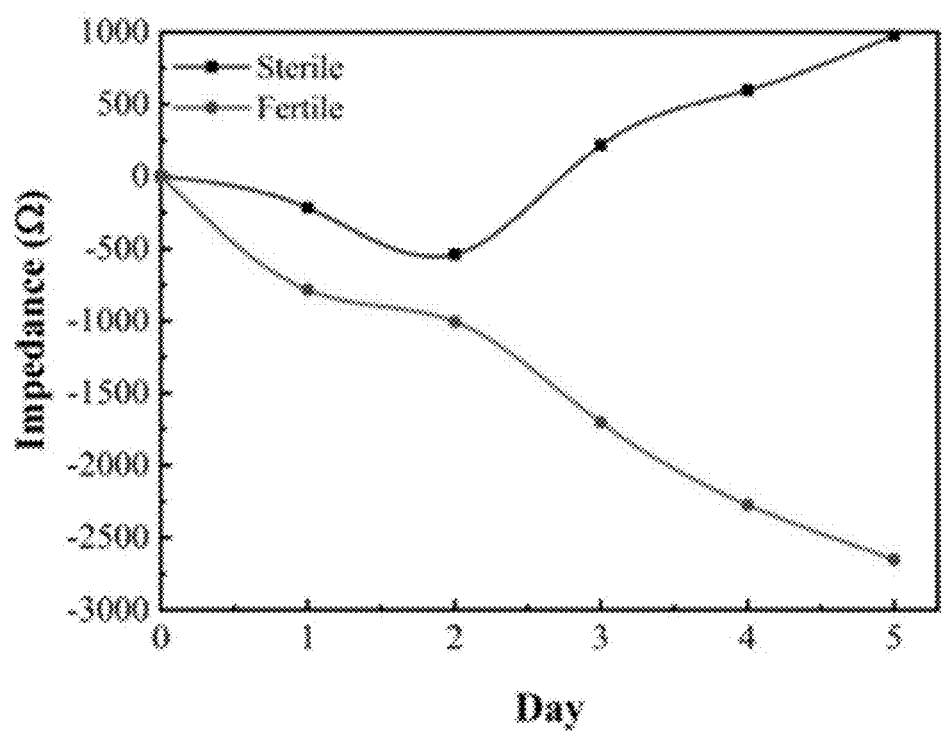
FIG. 24 is a graph showing the differential impedance ($\Delta|Z_{diff}|$) measurement from sensors in fertile and sterile soil samples over 5-days using the setup represented in FIG. 23.

FIG. 23 shows the experimental setup for these tests. Both sensing IDEs 108 and control IDEs 112 were placed inside a clear plastic container. Two incisions were made in order to insert the sensors 106 and 104 and were sealed with silicone glue to prevent any contamination and water loss. FIG. 24 shows differential impedance measurements taken from fertile and sterile samples over the 5-day period. The results show an initial decrease in impedance in both conditions. However, after day 2, the changes in impedance became more apparent with a faster decrease in the fertile soil and increase in sterile soil samples. The observed impedance increase in sterile soil samples may be explained by the gradual packing of soil particles on the bottom of the containers due to gravity. The packed soil has lower ionic mobility resulting in an increase impedance reading. Nevertheless, in the fertile soil containers, due to high levels of microbial activity, a faster degradation occurs on the insulating CA coating 110 on the sensing IDE 108, resulting in an overall decrease in impedance readings. These results further confirm the ability of using this system and technique for detection and possible quantification of levels of microbial activity, not only in aqueous environments, but also directly in soil environment.

A β-Glucoside enzyme assay was used to quantify the enzymatic activity of fertile and sterilized soil samples before and after the introduction of IDEs. The enzymatic activity of β-Glucoside in fertile soil samples was 3-fold larger than the activity in sterilized samples due to the reduced number of bacteria as a result of the autoclaving procedure. Results from day 5 showed a slight increase (about 5%) in enzymatic activity, which can be expected after introducing the sensors into the soil environment. The overall results from the enzymatic assay suggest that there is a clear correlation between the decrease in the differential impedance of the system and the bacterial population in the soil environment. This decrease is more strongly correlated to a growing population of bacteria, rather than the composition of the environment, as shown by results from experiments at different temperatures. At the same time, results from the soil experiment provided evidence that the system 100 can be readily used for potential future use in analyzing levels of microbial activity in agricultural fields. The system can also be used to determine specific enzyme activity in solutions and can be further implemented in soil systems for agricultural purposes.

As indicated by the above-noted investigations, the systems disclosed herein are suitable for detection and quantification of microbial activity in situ, as well as in a laboratory setting. By measuring the differential impedance readings from the sensing and control IDEs 108 and 112, it is possible to measure the degradation of the CA film 110 as a means to quantify bacterial cellulolytic activity in a growing medium 102.

Potential applications for these systems include but are not limited to the agricultural, environmental, and medical fields. For agriculture and environmental applications, large scale manufacturing of sensors could be used to determine changes in the microbial ecosystem under various conditions. It could potentially be used to study the effects of nitrate leaching near the gulfs, heavy pesticide usage in fields, or the effectiveness of fertilizers to improve agricultural production. In the medical field, this technology could be adapted to measure changes in microbial diversity within the lumen of the small intestine and to study the effects of different diets in our microbial flora. The low-cost and scalable manufacturing of the devices accompanied with the accuracy of the sensing technique could readily broaden our understanding of the effects of bacteria in our soils, water systems, and even within our own bodies.

As previously noted above, though the foregoing detailed description describes certain aspects of one or more particular embodiments of the invention and investigations associated with the invention, alternatives could be adopted by one skilled in the art. For example, the system and its components could differ in appearance and construction from the embodiments described herein and shown in the figures, functions of certain components of the system could be performed by components of different construction but capable of a similar (though not necessarily equivalent) function, process parameters such as temperatures and durations could be modified, and appropriate materials could be substituted for those noted. As such, and again as was previously noted, it should be understood that the invention is not necessarily limited to any particular embodiment described herein or illustrated in the drawings.

The invention claimed is:

1. A system for assessing a microbial characteristic within a growing medium, the system comprising:
    a control sensor configured to be located in the growing medium and to measure electrical resistance of the growing medium while therein;
    a sensing sensor configured to be located in the growing medium and to measure electrical impedance of a sensing element thereof while in the growing medium, wherein the sensing element comprises a microbially degradable material on a surface of a sensing electrode, and wherein contact of the sensing element with bacteria in the growing medium causes physical degradation of the microbially degradable material, and degradation of the microbially degradable material changes the impedance of the sensing element; and
    a computer system comprising one or more processors that run one or more software programs configured to determine a characteristic of the bacteria in the growing medium based on a resistance of the growing medium and an impedance of the sensing element as measured by the control sensor and the sensing sensor.

2. The system of claim 1, wherein the computer system is configured to receive measurements obtained by the control sensor and the sensing sensor simultaneously, analyze the measurements to determine a resistance of the growing medium and an impedance of the sensing element, determine a state of degradation of the sensing element based on the resistance of the growing medium and the impedance of the sensing element, and determine an amount of the bacteria in the growing medium based on the state of degradation.

3. The system of claim 1, wherein the computer system is configured to receive multiple measurements obtained by the control and sensing sensors simultaneously over a time period, analyze the measurements to identify changes in the resistance of the growing medium and changes in the impedance of the sensing element over the time period, determine a rate of degradation of the sensing element over the time period based on the identified changes, and determine a rate of growth of the bacteria in the growing medium based on the rate of degradation.

4. The system of claim 1, wherein each of the control sensor and the sensing sensor includes an array of interdigitated electrodes disposed on a substrate, wherein the array of the control sensor is configured to contact the growing medium, and the array of the sensing sensor comprises a coating thereon configured to contact the growing medium, and wherein the coating comprises a film formed of the microbially degradable material.

5. The system of claim 1, wherein the physical degradation caused by contact of the sensing element with bacteria includes the formation of pores on the surface of the sensing element, wherein the pores result in a decrease in differential impedance of the sensing element.

6. The system of claim 1, wherein the microbially degradable material of the sensing element is formed of a cellulose material.

7. The system of claim 6, wherein the cellulose material comprises cellulose acetate, chitin, lignin, or a combination thereof.

8. The system of claim 1, wherein the bacteria are *Pseudomonas aeruginosa*.

9. The system of claim 1, wherein the microbial characteristic comprises at least one of biomass and microbial activity.

10. A method of fabricating a sensing element of a sensing sensor for assessing a microbial characteristic in a growing medium, the sensing sensor being configured to be located in the growing medium and to measure electrical impedance while in the growing medium, the method comprising:
    forming a sensor electrode comprising an array of exposed, interdigitated electrodes on a substrate;
    coating the array on the substrate with a microbially degradable solution; and
    curing the solution to form a microbially degradable film on the array.

11. The method of claim 10, further comprising:
    performing a pretreatment process on the array prior to coating the array with the solution, wherein the pretreatment process includes:
    performing an initial plasma treatment of the sensor electrode;
    performing an APTES treatment on the initially plasma treated sensor electrode by submerging the array in a solution of 3-Aminopropyltriethoxysilane (APTES); and
    performing a secondary plasma treatment of the APTES treated sensor electrode.

12. The method of claim 10, wherein the microbially degradable solution comprises a cellulose acetate (CA) solution.

13. The method of claim 12 wherein the step of coating comprises drop casting the CA solution on the array.

14. A method of assessing a microbial characteristic in a growing medium, the method comprising:
    locating a control sensor in the growing medium, wherein the control sensor is configured to generate measurements of electrical resistance of the growing medium;
    locating a sensing sensor in the growing medium, wherein the sensing sensor comprises a sensing element comprising a sensing electrode configured to generate measurements of electrical impedance and a film of microbially degradable material on the surface of the sensing electrode, wherein degradation of the film changes impedance of the sensing element, and wherein contact of the sensing element with bacteria in the growing medium causes physical degradation of the microbially degradable material;

receiving measurements of electrical resistance of the growing medium and measurements of electrical impedance obtained from the control sensor and the sensing sensor simultaneously while located in the growing medium;

analyzing the measurements to determine the resistance of the growing medium and the impedance of the sensing element; and determining a characteristic of bacteria in the growing medium based on the resistance of the growing medium and the impedance of the sensing element.

15. The method of claim 14, wherein the step of determining a characteristic comprises:

determining a state of degradation of the sensing element based on the resistance of the growing medium and the impedance of the sensing element; and determining an amount of the bacteria in the growing medium based on the state of degradation.

16. The method of claim 14, wherein the step of determining a characteristic comprises:

receiving multiple measurements obtained by each of the control sensor and the sensing sensor simultaneously over a time period;

analyzing the measurements to identify changes in the resistance of the growing medium and changes in the impedance of the sensing element over the time period;

determining a rate of degradation of the sensing element over the time period based on the identified changes in resistance and changes in impedance; and determining a rate of growth of the bacteria in the growing medium based on the rate of degradation.

17. The method of claim 14, wherein each of the control sensor and the sensing sensor comprises an array of interdigitated electrodes on a substrate, wherein locating the control sensor and the sensing sensor in the growing medium includes locating the control sensor in the growing medium such that the array of the control sensor contacts the growing medium and locating the sensing sensor in the growing medium such that the film on the array of the sensing sensor contacts the growing medium.

18. The method of claim 14, further comprising measuring a decrease in differential impedance of the sensing element resulting from the formation of pores on the surface of the sensing element due to the physical degradation of the film caused by contact of the sensing element with the bacteria.

19. The method of claim 14, wherein the growing medium is soil.

* * * * *